United States Patent
Gaskins et al.

(10) Patent No.: US 7,278,040 B2
(45) Date of Patent: Oct. 2, 2007

(54) MECHANISM FOR PROVIDING MEASURED POWER MANAGEMENT TRANSITIONS IN A MICROPROCESSOR

(75) Inventors: Darius D. Gaskins, Austin, TX (US); James R. Lundberg, Austin, TX (US)

(73) Assignee: Via Technologies, Inc., Taipei (TW)

( * ) Notice: Subject to any disclaimer, the term of this patent is extended or adjusted under 35 U.S.C. 154(b) by 430 days.

(21) Appl. No.: 10/806,041

(22) Filed: Mar. 22, 2004

(65) Prior Publication Data
US 2004/0236975 A1 Nov. 25, 2004

Related U.S. Application Data

(60) Provisional application No. 60/456,994, filed on Mar. 21, 2003.

(51) Int. Cl.
*G06F 1/04* (2006.01)
*G06F 1/08* (2006.01)
(52) U.S. Cl. ........................... 713/322; 327/113
(58) Field of Classification Search ............... 713/300; 327/113
See application file for complete search history.

(56) References Cited

U.S. PATENT DOCUMENTS 4,835,728 A * 5/1989 Si et al. ..................... 713/401
5,721,935 A 2/1998 DeShepper et al.
5,724,591 A * 3/1998 Hara et al. .................. 713/322
6,115,763 A * 9/2000 Douskey et al. .............. 710/72
2003/0196127 A1 10/2003 Olsen

FOREIGN PATENT DOCUMENTS

WO    WO0022501    4/2000

* cited by examiner

Primary Examiner—Rehana Perveen
Assistant Examiner—Anand B. Patel
(74) Attorney, Agent, or Firm—Richard K. Huffman; James W. Huffman (57) ABSTRACT

An apparatus and method are provided that enable a computing device to make graceful power state transitions that do no impose unnecessary power surge compensations requirements on associated power sources. The apparatus has power control logic that is configured to determine if the computing device is to enter a low power state. The power control logic includes a plurality of stop signals. Each of the plurality of stop signals sequentially indicates that a corresponding clock signal be stopped, where the corresponding clock signal is operatively coupled to a corresponding sector logic element within the computing device.

21 Claims, 6 Drawing Sheets

MECHANISM FOR MEASURED POWER MANAGEMENT TRANSITIONS

FIG. 7

MECHANISM FOR PROVIDING MEASURED POWER MANAGEMENT TRANSITIONS IN A MICROPROCESSOR

CROSS-REFERENCE TO RELATED APPLICATIONS

This application claims the benefit of U.S. Provisional Application No. 60/456,994, filed on Mar. 21, 2003, which is herein incorporated by reference for all intents and purposes.

BACKGROUND OF THE INVENTION

1. Field of the Invention

This invention relates in general to the field of microelectronics, and more particularly to a mechanism for providing measured power management transitions in a computing device.

2. Description of the Related Art

Most present day computing devices provide some form of a low power state that is entered as a result of asserting an external signal, or executing a special-purpose instruction, or encountering a fatal error condition. For example, within an x86-compatible microprocessor there are two machine states called stop grant and auto halt where the internal clock signals to most of the functional logic blocks on the microprocessor are stopped. Stopping the internal clock signals to these logic blocks significantly reduces the amount of power that is being consumed by the microprocessor. However, not all clock signals are stopped. Those which are provided to a small number of logic blocks (e.g., bus snoop logic, interrupt logic) must remain enabled to allow certain processor events to be handled, but for all intents and purposes, the microprocessor is essentially powered down. That is, power is applied to the microprocessor, but the functional blocks are not consuming power because they are not executing operations. In an x86-compatible microprocessor, the stop grant state is invoked by asserting the STPCLK# pin on the microprocessor. The auto halt state is invoked by executing a HALT instruction. When either of these two states are invoked, an x86-compatible microprocessor is required to stop the clock signals to the appropriate logic elements on the chip. Other microprocessors enter their corresponding low power state via different mechanisms, but the manner by which they "power down" functional logic blocks is the same, that is, by stopping the clock signals that are provided to those functional logic blocks. Thus, to enter a low power state, a present day microprocessor will stop all of the clock signals that are routed to the logic elements that must be powered down. And the clock signals are all stopped during a single clock cycle. To exit from the low power state, the microprocessor will start all of the clock signal during a single clock cycle as well.

This immediate entry into or exit from the low power state creates a significant strain on the supply that provides power to the microprocessor by requiring voltage regulation in the presence of a drastic reduction in current. To compensate for voltage spikes on the supply busses that would otherwise be incurred by this drastic change in current, stringent power surge requirements are allocated to voltage regulation logic associated with the power supply, thus driving up the cost of a system (or of a motherboard if the power supply is embodied as a voltage regulator on the motherboard). Surge compensation mechanisms and filtering circuits within voltage regulators generally take the form of large, costly capacitors to handle low frequency components of a voltage spike along with a significant number of smaller capacitors which are deployed adjacent to logic elements on an integrated circuit itself to compensate for high frequency components of the voltage spike.

The aforementioned surge compensation and voltage filtering components are indeed effective, yet the present inventors have observed that most of the components are required solely to handle the drastic reduction (or increase) in current that is incurred when a computing device enter (or exits) a low power state within a single clock cycle. The present inventors have also noted that entry into or exit from a low power state within a single clock cycle is entirely unnecessary from the standpoint of any application that is being executed on a computing device.

In addition to imposing stringent power surge compensation requirements on the power supply, the drastic change in current requirements of a particular computing device results in a significant compression of its own operating voltage as a consequence of on-die voltage drop due to parasitic loop inductance (i.e., package effect). For example, following packaging of a particular computing device, it is tested and "binned" according to its maximum operating frequency. Because the speed at which a transistor switches is based largely upon its supplied operating voltage, this significant drop in on-chip operating voltage forces designers to operate the computing device at a lower frequency in order to produce correct results.

Therefore, what is required is an apparatus within a computing device for gracefully entering and leaving low power states.

In addition, a method is desirable that would enable entry into or exit from a low power state that does not impose unnecessary surge compensation requirements on a power source.

Furthermore, what is needed is a mechanism for managing power transitions in a computing device that provides for graceful transitions from one power state to the next.

SUMMARY OF THE INVENTION

The present invention, among other applications, is directed to solving the above-noted problems and addresses other problems, disadvantages, and limitations of the prior art. The present invention provides a superior technique for enabling measured and graceful power management transitions in a computing device that allows for less stringent voltage surge compensation mechanisms to be employed in an associated power supply and within the computing device itself, resulting in systems that are less costly than have heretofore been provided. In one embodiment, an apparatus for providing measured power transitions in a computing device is envisioned. The apparatus includes power control logic and interval logic. The tower control logic is configured to determine if the computing device is to enter a low power state. The power control logic generates plurality of stop signals, each sequentially indicating that a corresponding clock signal be stopped. The corresponding clock signal is operatively coupled to a corresponding sector logic element within the computing device. The interval logic is coupled to the power control logic, and is configured to provide a programmable number of clock cycles to the power control logic, whereby the power control logic causes the each of the plurality of stop signals to indicate that the corresponding clock signal be stopped after the programmable number of clock cycles.

One aspect of the present invention contemplates a power transition management mechanism. The power transition management mechanism has interval logic and power control logic. The interval logic provides one or more programmable numbers of clock cycles. The power control logic is coupled to the interval logic. The power control logic receives the one or more programmable numbers, and employs the one or more programmable numbers to sequentially stop each of a plurality of clock signals that are coupled to each of a corresponding plurality of sector logic elements.

Another aspect of the present invention comprehends a method for providing measured power transitions in a computing device. The method includes determining if the computing device is to enter a low power state, sequentially stopping clock signals that are coupled to each of a plurality of sector logic elements, and providing a programmable number of clock cycles that are to transpire between said stopping of the clock signals.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on present day computing devices and their associated power supply requirements, examples will now be discussed with reference to FIGS. 1 and 2 that more specifically describe the limitations of and problems associated with current techniques for taking a computing device to a low power state. Following this, a discussion of the present invention will be presented with reference to FIGS. 3-7. The present invention overcomes the limitations of present day power transition techniques by providing apparatus and methods for sequentially stopping the clocks provided to the functional logic elements within a computing device, thereby reducing the rate of current change that an associated power supply is currently required to support and consequently reducing the requirements to filter and/or suppress voltage transients.

Figure 1:
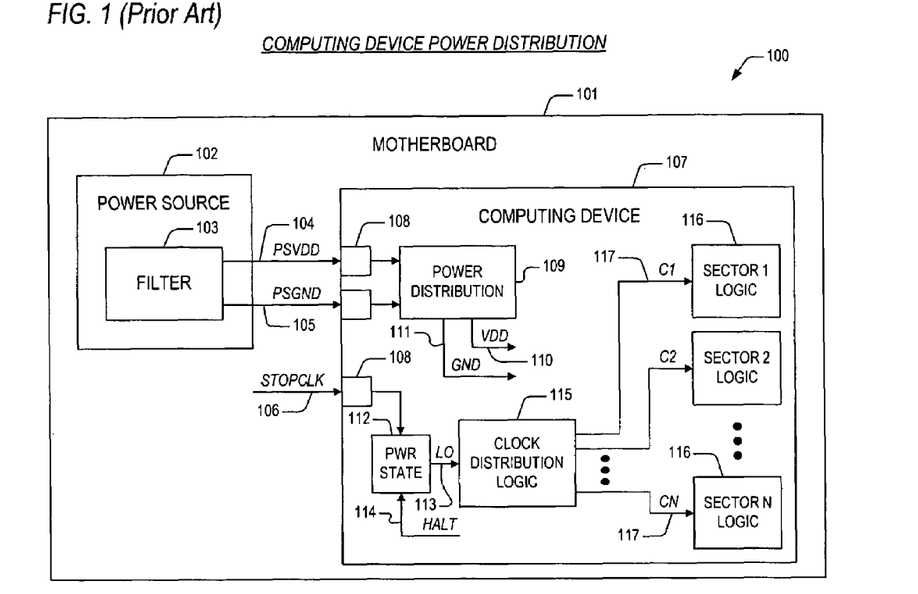
FIG. 1 is a block diagram illustrating how power is distributed in a present day computing device.

Now referring to FIG. 1, a block diagram 100 is presented illustrating how power is distributed within a present day computing device 107. The block diagram 100 shows a power source 102 that provides power to the computing device 107 via a power bus PSVDD 104 and a return bus PSGND 105. The computing device 107 is coupled to the PSVDD bus 104 and the PSGND bus 105 via one or more pins (or leads) 108 on its package. The power bus 104 and return bus 105 are provided to some form of power distribution 109 that receives and filters the power, and that distributes the power to all logic devices 112, 115, 116 within the computing device 107 via a voltage bus VDD 110 and a ground bus 111. Often, the power distribution 109 is no more than a distribution network of metal traces on a die. The computing device 107 also includes clock distribution logic 115 that distributes clock signals C1:CN 117 to a plurality of sector logic elements 116. Power state logic 112 is coupled to one or more external pins 108 and to a low power sense bus HALT 114. The power state logic 112 provides a low power signal LO 113 to the clock distribution logic 115. In a typical system, both the computing device 107 and the power source 102 are provided on a motherboard 101.

The computing device 107 may be one of a number of different devices that distribute clock signals 117 to various sector logic elements 116 for the purpose of performing operations within the sector logic elements 116. For example, the computing device 107 may be embodied as but not limited to any number of sequential logic devices, a graphics controller, logic within a chipset, a co-processor, a microcontroller, or a microprocessor. One skilled in the art will appreciate the vast number of clocked devices extant in the art and contemplated in the future that distribute clock signals 117 to sector logic elements 116 in this manner. Accordingly, for purposes of clearly teaching the present invention, examples will henceforth be discussed where the computing device 107 is embodied as a microprocessor 107 because the architecture of such is so widely known. The present inventors note however, that the scope and spirit of the present invention is not limited to embodiment of the computing device 107 solely as a microprocessor.

Integrated computing devices 107, as alluded to above, are configured as a plurality of sector logic elements 116. In the context of a microprocessor 107, sector logic elements 116 are also referred to as functional units 116. A functional unit 116 is logic, circuits, devices, or microcode, or a combination of logic, circuits, devices, or microcode, or equivalent elements that are employed to perform an associated function within the microprocessor 107. The elements employed to perform the associated function may be shared with other circuits, microcode, etc., that are employed to perform other functions within the microprocessor 107. According to the scope of the present application, microcode is a term employed to refer to one or more micro instructions. A micro instruction (also referred to as a native instruction) is an instruction at the level that a functional unit 116 executes. For example, micro instructions are directly executed by a reduced instruction set computer (RISC) microprocessor 107. For a complex instruction set computer (CISC) microprocessor 107 such as an x86-compatible microprocessor 107, x86 instructions are translated into associated micro instructions, and the associated micro instructions are directly executed by one or more functional units 116 the CISC microprocessor 116. For example, the sector 1 logic 116 could be an L1 data cache within the microprocessor 107. The sector 2 logic 116 could be an L2 cache within the microprocessor 107. Other sector logic elements 116 could be a branch prediction unit, a floating point execution unit, and integer execution unit, a register file, and so on. One skilled in the art will appreciate that a present day computing device could conceivably comprise hundreds of sector logic elements 116.

In operation, each of the sector logic elements 116 within the computing device 107 perform work as directed in synchronization with a provided clock signal 117. If the clock signal 117 is stopped, the work within a corresponding sector logic element 116 ceases. And since virtually all present day logic elements 116 are CMOS devices, one skilled in the art will appreciate that a given sector logic element 116 is drawing little or no current from the internal power buses 110, 111 when its corresponding clock signal 117 is stopped.

In a more specific example of a present day microprocessor 107, the power source 102 is often embodied as a voltage regulator 102 mounted to the motherboard 101. The power source supplies a power voltage, such as 3.3 volts, over the power bus PSVDD 104 to power pins 108 on the microprocessor 107. The PSGNG bus 105 typically supplies a return voltage to which the GND bus 111 within the microprocessor 107 is referenced. The power distribution 109 filters the voltage supplied from the power source 102 and directly distributes this voltage to the sector logic elements 116. Alternatively, the power distribution 109 may translate the supplied voltage into a core voltage, such as a 1.5-volt core voltage, and then distribute the core voltage to the logic elements 116 over the VDD bus 110.

As is noted above, any number of events, signals, or circumstances may transpire which would cause a computing device 107 that is operating in one power mode to transition to a low power mode and to exit from that low power mode to a different operating mode. In an x86-compatible microprocessor 107, the low power mode (i.e., stop grant state) is to be entered when an external STPCLK# signal is asserted. For purposes of teaching the present invention, an external signal that directs the computing device 107 to enter its low power state is shown in the block diagram 100 as signal STOPCLK 106, which is received through a pin 108 and which is routed to the power state logic 112. Also shown is signal HALT 114, which is provided to the power state logic 112. Signal HALT 114 is asserted when an instruction or event other than an external signal assertion directs the computing device 107 to enter its low power state. And whether directed by external signal STOPCLK 106 or by internal signal HALT 114, it is assumed for purposes of teaching the present invention that the low power state for the computing device 107 is entered by stopping the clock signals 117 to designated sector logic elements 116 and the low power state is exited by starting the clock signals 117 to designated sector logic elements 116. One skilled in the art will appreciate that a given computing device 107 may have more than one low power state where different combinations of sector logic elements 116 are powered down by stopping their respective clock signals 117. The present invention, as described below, comprehends such a configuration.

In a typical computing device 107, when directed to enter the low power state, the power state logic 112 directs the clock distribution logic 115 to stop designated clock signals 117 to their corresponding sector logic elements 116 by asserting signal LO 113. In turn, the clock distribution logic 115 stops the designated clock signals 117 typically within a single clock cycle. This drastic reduction in current over the VDD and GND buses 110, 111 is translated to the PSVDD and PSGND buses 104, 105 such that a significant stress is placed upon the power source 102 to suppress voltage transients that would otherwise be seen on the external supply buses 104, 104 and internal power buses 110, 111. Present day power sources 102 consequently provide a power transient filter 103 to suppress voltage transients resulting from rapid current changes. In addition, although not shown in the block diagram 100, a present day computing device 107 will provide numerous on-chip transient suppression devices (i.e., capacitive devices) (not shown) to suppress both low and high frequency voltage transients. Moreover, a present day computing device 107 will be limited in its upper operating frequency as a result of the on-chip voltage drop that is incurred from parasitic loop inductance when operating current rapidly changes. The effects of a rapid reduction in current within the computing device 107 through entering a low power state will now be discussed more specifically with reference to FIG. 2.

Figure 2:
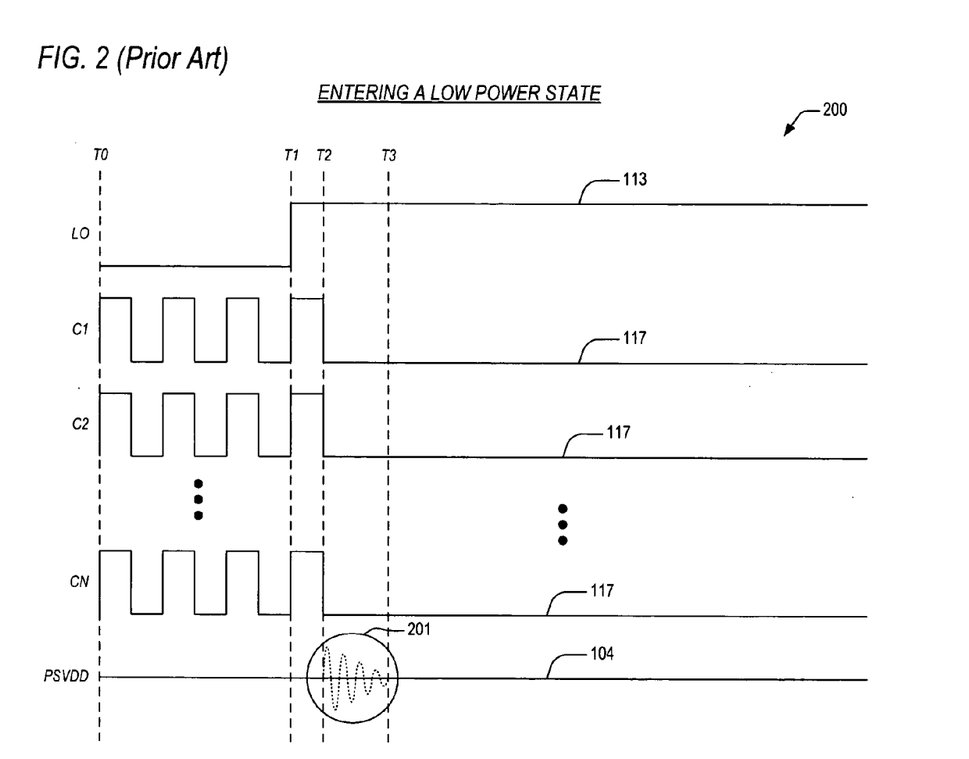
FIG. 2 is a timing diagram depicting how the computing device of FIG. 1 enters a low power state.

Turning to FIG. 2, a timing diagram 200 is shown depicting how the computing device 107 of FIG. 1 enters its low power state. The timing diagram 200 depicts signal LO 113 that is asserted at time Ti, directing the clock distribution logic 115 to stop designated clock signals 117, thus causing the computing device 107 to enter the low power state. For purposes of illustration, all of the clock signals C1:CN 117 are stopped for entry into the low power state. Responsive to assertion of signal LO 113 at time T1, the clock distribution logic 115 stops clock signals C1:CN one clock cycle later at time T2. Because the current requirements of the computing device 107 significantly decrease at time T2, power generation elements (not shown) within the power source 102 are notably stressed. Hence, the external power bus PSVDD 104 is shown in the timing diagram 200 to remain approximately at a constant supply voltage when the clock signals 117 are stopped at time T2. This is because such a power state transition is well understood in the art and, consequently, transient suppression requirements are allocated to the power supply 102 to maintain an approximately constant voltage on bus PSVDD 104 in the event that such a transition occurs. Accordingly, the power supply 102 includes a filter 103 as described above that satisfies the allocated transient suppression requirements. Dashed transient 201, starting at time T2 and ending at time T3, is provided to depict a typical voltage transient 201 that would otherwise be transmitted on the external power supply bus 104, on the external power return bus PSGND 105 (i.e., a transient such as transient 201 superimposed at the reference voltage), and to a lesser degree on the internal VDD bus 110 and internal GND bus 111 as a result of parasitic loop inductances. But because of the filter 103 within the power source 102 and because of numerous transient filters (e.g., capacitive devices) (not shown) within the computing device 107, the transient effect 201 of stopping the clocks C1:CN 117 concurrently at time T2 is not transmitted through to the computing device 107 at a level which would degrade performance.

The present inventors have noted that the configuration of a system as shown in FIG. 1 is disadvantageous from several aspects, one of which is cost. Expensive transient suppression filters 103 are added to the design of present day power sources 102 to provide for rapid decreases—and increases (i.e., when a low power state is exited)—in current provided to a coupled computing device 107. In addition, the inventors note that these rapid increases (and decreases) in current are due in large part to the manner in which a present day computing device enters into (and exits from) a low power state. Furthermore, as noted above, the present inventors have also observed that it is entirely unnecessary to simultaneously "power down" all of the sector logic elements 116 that are not required to be operational in a low power state.

Therefore, to address the aforementioned limitations and other problems in the art, the present invention is provided, and will henceforth be discussed with reference to FIGS. 3-7, to which attention is now directed.

Figure 3:
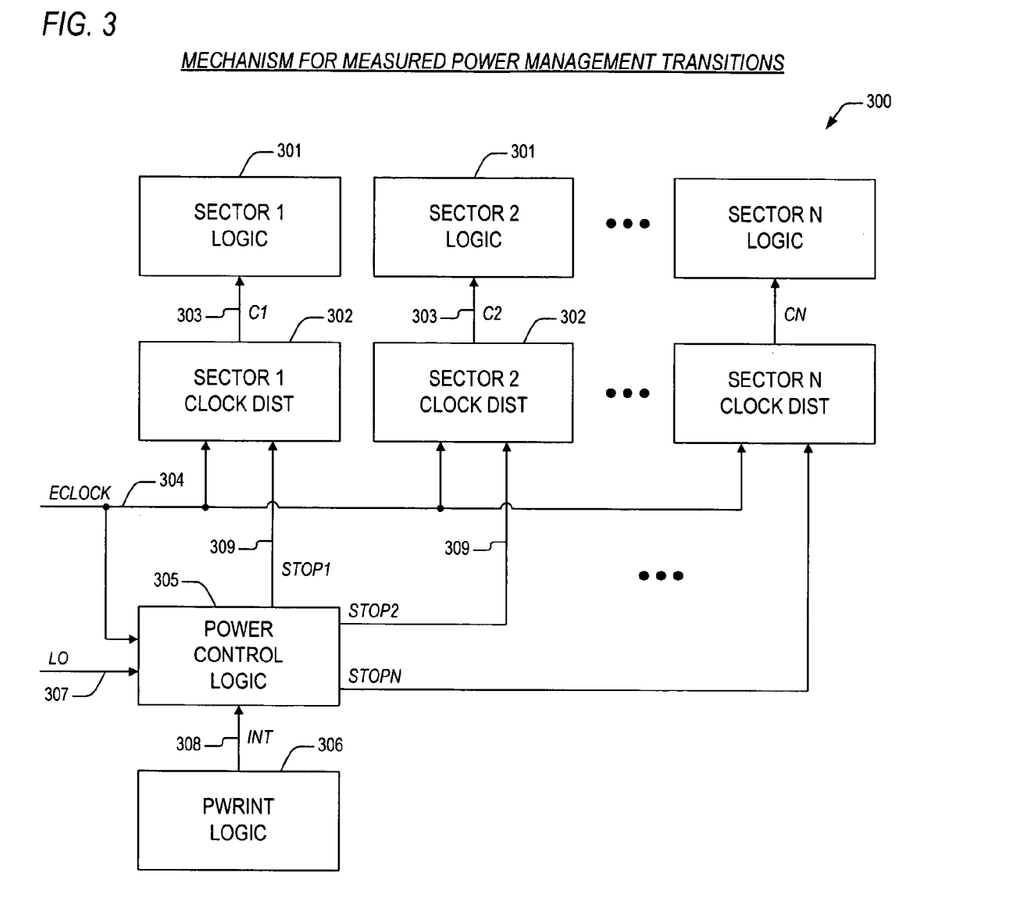
FIG. 3 is a block diagram featuring the mechanism for providing measured power management transitions according to the present invention.

Referring to FIG. 3, a block diagram is presented featuring the mechanism 300 for providing measured power management transitions according to the present invention. The mechanism 300 includes power control logic 305 that is coupled to power interval logic 306 via an interval bus INT 308. The power control logic 305 provides a plurality of stop signals STOP1:STOPN to a corresponding plurality of clock distribution logic elements 302. Each of the clock distribution logic elements 302 receives a clock signal ECLOCK 304 and provide a local clock signal C1:CN 303 to their associated sector logic elements 301. The ECLOCK signal 304 is also provided to the power control logic 305. In addition, a low power state signal LO 307 is coupled to the power control logic 305.

In operation, each of the sector logic elements 301 perform work as directed within a computing device (not shown) in synchronization with their individual local clock signals 303, which are synchronized with the ECLOCK clock signal 304. And like the sector logic elements 116 of FIG. 1, if a particular clock signal 303 (say, signal C2 303) is stopped, then the work within its corresponding sector logic element 301 (i.e., SECTOR 2 LOGIC) ceases.

For clarity purposes, power source and filtering elements are not shown in FIG. 3 which provide voltage VDD and return GND to each of the logic elements in the mechanism 300. Nor is logic shown that senses assertion of signals, execution of instructions, or other events that would cause an associated computing device to enter its low power state. In accordance with the above discussion, it is assumed that signal LO 307 is asserted when a low power state is to be entered, and LO 307 is terminated when the low power state is to be exited. Although a single signal LO 307 is depicted in the block diagram, it is noted that the present invention contemplates a bus LO 307 whose state directs the power control logic 305 to enter into one of a plurality of low power states, where each of the plurality of low power states is entered by stopping the clock signals 303 to a corresponding combination of sector logic elements 301.

In contrast to a present day computing device 107, when directed to enter the low power state, the mechanism 300 according to the present invention does not stop all designated clock signals 303 simultaneously. Instead, the power interval logic 306 provides a programmable number of clock cycles to the power control logic 305 via bus INT 308. In one embodiment, the programmable number of clock cycles comprise a plurality of programmable numbers of clock cycles that correspond to each of the sector logic elements 301 that prescribe the number of clock cycles that are to transpire between stopping a given clock signal 303 (say, signal C2 303) to a given sector logic element 301 (i.e., SECTOR 2 LOGIC 301) and stopping a next clock signal 303 (say, signal C3 303) to a next sector logic element 301 (i.e., SECTOR 3 LOGIC 301). In an alternative embodiment, the programmable number of clock cycles comprises a single value that prescribes the number of clock cycles that are to transpire between stopping any clock signal 303 to its given sector logic element 301 and stopping a next clock signal 303 to a next sector logic element 301. In the first embodiment, the number of clock cycles that are provided via INT 308 are programmable for each of the sector logic elements 301. In the alternative embodiment, the number of clock cycles is a single number that applies to all of the sector logic elements.

Responsive to receipt of the programmable number of clock cycles via bus INT 308, the power control logic sequentially asserts the plurality of stop signals STOP1:STOPN 309 to their corresponding clock distribution logic 302 in synchronization with ECLOCK 304, but only after the number of clock cycles provided via bus INT 308 have transpired. Assertion of a STOP signal 309 directs the corresponding clock distribution logic element 302 to stop its clock signal 303 to its associated sector logic element 301. It is noted that the order in which the stop signals 309 are asserted is a function of the design of the power control logic 305, as is the combination of stop signals 309 which are asserted to enter a particular low power state. The power control logic 305 comprises logic, circuits, devices, or microcode, or a combination of logic, circuits, devices, or microcode, or equivalent elements that are employed to perform the aforementioned function within a computing device according to the present invention. The elements employed to perform the aforementioned function may be shared with other circuits, microcode, etc., that are employed to perform other functions within the computing device.

As each of the stop signals 309 is asserted, its corresponding sector logic element 301 is "powered down." And in contrast to the clock distribution logic 115 of FIG. 1 which stops the clock signals 117 typically within a single clock cycle, the mechanism 300 according to the present invention provides for a graceful transition from one power state to the low power state. Hence, there is no drastic reduction in current requirements and, consequently, less stringent filtering requirements need be allocated to filtering devices (not shown) within an associated computing device or to its coupled power source (not shown).

Figure 4:
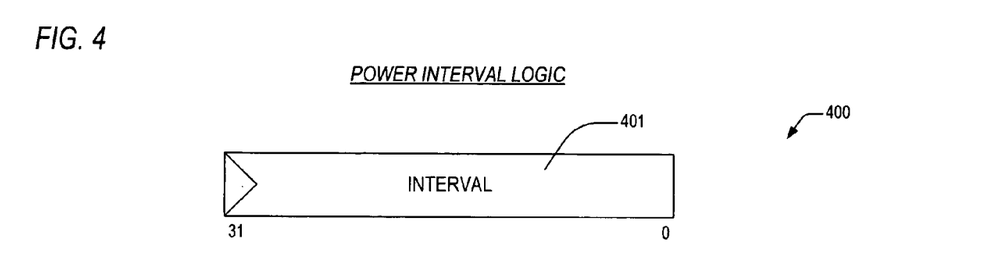
FIG. 4 is a block diagram showing one embodiment of power interval logic according to the present invention.

Now turning to FIG. 4, a block diagram is presented showing one embodiment of power interval logic 400 according to the present invention. In the embodiment shown, the power interval logic 400 comprises a register 400 that has a 32-bit INTERVAL field 401. The value of the INTERVAL field 401 is programmed to indicate a single number of clock cycles that are to transpire between stopping a given clock signal 303 to its given sector logic element 301 and stopping a next clock signal 303 to its next sector logic element 301. In another embodiment, the value of the INTERVAL field 401 is programmed to indicate a single number of clock cycles that are to transpire between stopping a given clock signal 303 to its given sector logic element 301 and stopping a next clock signal 303 to its next sector logic element 301 and also to indicate (in the case of leaving a low power state) a single number of clock cycles that are to transpire between starting a given clock signal 303 to its given sector logic element 301 and starting a next clock signal 303 to its next sector logic element 301. The power interval logic 400 comprises logic, circuits, devices, or microcode, or a combination of logic, circuits, devices, or microcode, or equivalent elements that are employed to perform the aforementioned functions within a computing device according to the present invention. The elements employed to perform the aforementioned functions may be shared with other circuits, microcode, etc., that are employed to perform other functions within the computing device. In a first embodiment, the value of the INTERVAL field 401 is programmed by executing an instruction within the computing device that directs the computing device to set the value of the INTERVAL field 401. In another embodiment, the value of the interval field is programmed according to the states of a plurality of fuses (not shown) that are operatively coupled to the power interval logic 400. The present invention also contemplates other techniques for setting the value of the INTERVAL field 401 to include reading a value from memory, setting the state of pins on a computing device package, and etc. In an embodiment having separately programmable numbers of clock cycles for each sector logic element within a computing device according to the present invention, a plurality of power interval logic elements 400 are provided that correspond in number to the number of sector logic elements 301 within the computing device.

Figure 5:
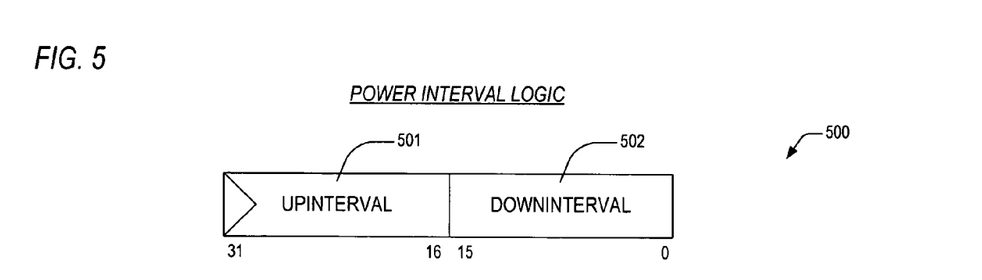
FIG. 5 is a block diagram illustrating another embodiment of power interval logic according to the present invention.

Referring to FIG. 5, a block diagram is provided illustrating another embodiment of power interval logic 500 according to the present invention. In the embodiment shown, the power interval logic 500 comprises a register 400 that has a 16-bit UPINTERVAL field 401 and a 16-bit DOWNINTERVAL field 502. The value of the UPINTERVAL field 401 is programmed to indicate a single number of clock cycles that are to transpire (in the case of exiting a low power state) between starting a given clock signal 303 to its given sector logic element 301 and starting a next clock signal 303 to its next sector logic element 301. The value of the DOWNINTERVAL field 402 is programmed to indicate a single number of clock cycles that are to transpire (in the case of entering a low power state) between stopping a given clock signal 303 to its given sector logic element 301 and stopping a next clock signal 303 to its next sector logic element 301. The values of the fields 501, 502 are programmed in the same manner as the INTERVAL field 401 is programmed as discussed above with reference to the embodiment of FIG. 4. Additionally, in an embodiment having separately programmable numbers of clock cycles for each sector logic element within a computing device according to the present invention, a plurality of power interval logic elements 500 are provided that correspond in number to the number of sector logic elements 301 within the computing device.

Figure 6:
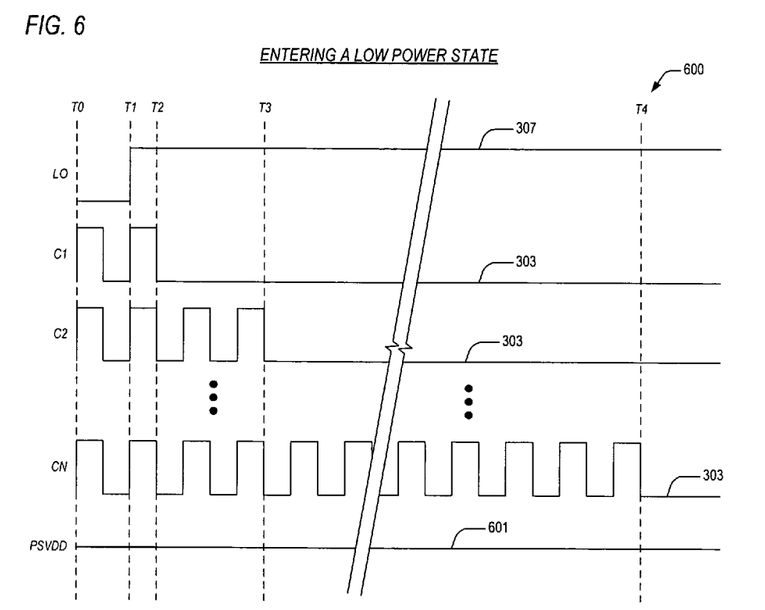
FIG. 6 is a timing diagram detailing how a computing device according to the present invention enters a low power state.

Now turning to FIG. 6, a timing diagram 600 is shown detailing how a computing device according to the present invention enters a low power state. The timing diagram 400 depicts signal LO 307 that is asserted at time T1, directing the power control logic 305 to stop designated clock signals 303, thus causing the computing device to enter the low power state. For purposes of illustration, all of the clock signals C1:CN 303 are stopped for entry into the low power state. Responsive to assertion of signal LO 307 at time T1, the power control logic 305 receives the value(s) of the power down interval(s) from the power interval logic 306 via bus 306 which indicates the number of clock cycles that are to transpire between stopping the clock signals 303 to sequential ones of the plurality of sector logic elements 301. For purposes of illustration, the value of the power down interval is programmed to be two clock cycles and is a single value for all sector logic elements 302. Accordingly, the power control logic 305 asserts STOP1 signal 309 to the sector 1 clock distribution logic 302 causing clock signal C1 303 to stop at time T2, thus powering down SECTOR 1 LOGIC 301. Two clock cycles later, the power control logic 305 asserts STOP2 signal 309 to the sector 2 clock distribution logic 302 causing clock signal C2 303 to stop at time T3, thus powering down SECTOR 2 LOGIC 301. This sequence of successively turning off clock signals 303 continues every two clock cycles until finally the last clock signal CN 303 is turned off at time T4. Because the current requirements of the computing device according to the present invention gracefully decrease during the interval between times T2 and T4, much less stringent transient suppression requirements need be flowed to the source of power for the computing device, thus enabling designers to provide less costly systems. An exemplary external power bus PSVDD 601 is shown in the timing diagram 400 to remain approximately at a constant supply voltage when the clock signals 303 are stopped in a measured manner between times T2 and T4 because transitioning power states in this manner does not put undue stress on a power source.

Figure 7:
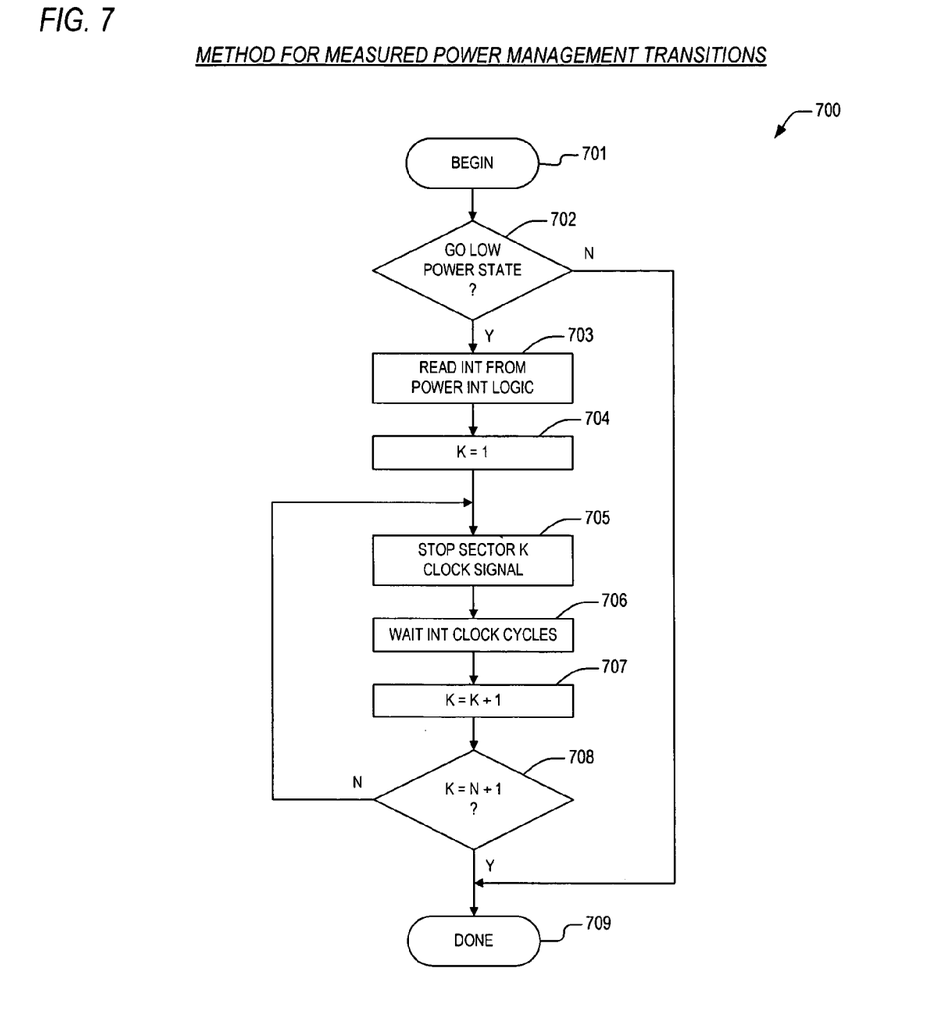
FIG. 7 is a flow chart showing the method according to the present invention for providing measured power management transitions in a computing device.

Now referring to FIG. 7, a flow chart 700 is presented showing the method according to the present invention for providing measured power management transitions in a computing device.

Flow begins at block 701 where the computing device is operating in a power state other than a low power state. Flow then proceeds to decision block 702.

At decision block 702, an evaluation is made to determine if the computing device should be taken to a low power state. If not, then flow proceeds to block 709. If a low power state is directed, then flow proceeds to block 703.

At block 703, a value INT is read from power interval logic according to the present invention. The value INT, in one embodiment, indicates the number of clock cycles that are to transpire between stopping a first clock signal to a first sector logic element and stopping a second clock signal to a second sector logic element. Flow then proceeds to block 704.

At block 704, a counter K is initialized to 1. Flow then proceeds to block 705.

At block 705, the Kth clock signal to sector K logic element is stopped, thus powering down the sector K logic element. Flow then proceeds to block 706.

At block 706, a number of clock cycles transpire corresponding to the value INT that was read at block 703. Flow then proceeds to block 707.

At block 707, the counter K is incremented by 1. Flow then proceeds to decision block 708.

At decision block 708, the counter K is evaluated to determine if all of the designated clock signals have been stopped. That is, for N clock signals, if K equals N+1, then all N clock signals have been stopped. If not, then flow proceeds to block 705. If so, then flow proceeds to block 709.

At block 709, the method completes.

By entering and leaving low power states in a measured manner as described hereinabove, a computing device according to the present invention provides for a controlled power transient characteristic that enables power supply and power regulation requirements to be significantly relaxed, thus decreasing the cost of the computing device itself, its associated power supply, and the overall system cost.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for providing measured power transitions in a computing device, the apparatus comprising:
    power control logic, configured to determine if the computing device is to enter a low power state, and configured to generate a plurality of stop signals, each of said plurality of stop signals sequentially indicating that a corresponding clock signal be stopped, wherein said corresponding clock signal is operatively coupled to a corresponding sector logic element within the computing device; and interval logic, coupled to said power control logic, configured to provide a programmable number of clock cycles to said power control logic, whereby said power control logic causes said each of said plurality of stop signals to indicate that said corresponding clock signal be stopped after said programmable number of clock cycles.

2. The apparatus as recited in claim 1, wherein said each of said plurality of stop signals indicates that said corresponding clock signal be stopped after a programmable number of clock cycles.

3. The apparatus as recited in claim 2, wherein said programmable number of clock cycles is established for said each of said plurality of stop signals.

4. The apparatus as recited in claim 2, wherein said programmable number of clock cycles is the same number of clock cycles for said each of said plurality of stop signals.

5. The apparatus as recited in claim 1, wherein said interval logic comprises a register.

6. The apparatus as recited in claim 5, wherein said programmable number is provided by executing an instruction to program said register.

7. The apparatus as recited in claim 5, wherein said programmable number is provided by setting the state of fuses, said fuses being coupled to said register.

8. A power transition management mechanism, comprising:

interval logic, for providing one or more programmable numbers of clock cycles; and power control logic, coupled to said interval logic, for receiving said one or more programmable numbers, and for employing said one or more programmable numbers to sequentially stop etch of a plurality of clock signals that are coupled to each of a corresponding plurality of sector logic elements.

9. The power transition management mechanism as recited in claim 8, wherein said power control logic sequentially stops said each of a plurality of clock signals by asserting a corresponding each of a plurality of stop signals, wherein said each of a plurality of stop signals indicates that said each of a plurality of clock signals be stopped after a number of clock cycles have transpired, wherein said number is based upon said one or more programmable numbers.

10. The power transition management mechanism as recited in claim 9, wherein said one or more programmable numbers is established for said each of a plurality of stop signals.

11. The power transition management mechanism as recited in claim 9, wherein said one or more programmable numbers is the same for said each of a plurality of stop signals.

12. The power transition management mechanism as recited in claim 8, wherein said interval logic comprises a register.

13. The power transition management mechanism as recited in claim 12, wherein said one or more programmable numbers are provided by executing an instruction to program said register.

14. The power transition management mechanism as recited in claim 12, wherein said one or more programmable numbers are provided by setting the state of fuses, said fuses being coupled to said register.

15. An method for providing measured power transitions in a computing device, the method comprising:

determining if the computing device is to enter a low power state;

sequentially stopping clock signals that are coupled to each of a plurality of sector logic elements; and providing a programmable number of clock cycles that are to transpire between said stopping of the clock signals.

16. The method as recited in claim 15, wherein said sequentially stopping comprises:

via each of a plurality of stop signals coupled to each of the plurality of sector logic elements, indicating that a corresponding one of the clock signals be stopped after the programmable number of clock cycles have transpired.

17. The method as recited in claim 16, wherein said indicating comprises:

establishing the programmable number of clock cycles for the each of the plurality of stop signals.

18. The method as recited in claim 16, wherein said indicating comprises:

establishing the same programmable number of clock cycles for the each of the plurality of stop signals.

19. The method as recited in claim 15, wherein said providing comprises:

programming the programmable number of clock cycles into a register.

20. The method as recited in claim 19, wherein said providing comprises:

executing an instruction to accomplish said programming.

21. The method as recited in claim 19, wherein said providing comprises:

reading the states of fuses to accomplish said programming.

* * * * *